(12) United States Patent
Lin et al.

(10) Patent No.: US 7,250,983 B2
(45) Date of Patent: Jul. 31, 2007

(54) SYSTEM AND METHOD FOR OVERLAYING IMAGES FROM MULTIPLE VIDEO SOURCES ON A DISPLAY DEVICE

(75) Inventors: Walter C. Lin, Santa Clara, CA (US); Jiande Jiang, San Jose, CA (US)

(73) Assignee: Trident Technologies, Inc., Sunnyvale, CA (US)

( * ) Notice: Subject to any disclaimer, the term of this patent is extended or adjusted under 35 U.S.C. 154(b) by 517 days.

(21) Appl. No.: 10/912,647

(22) Filed: Aug. 4, 2004

(65) Prior Publication Data

US 2006/0028583 A1    Feb. 9, 2006

(51) Int. Cl.
*H04N 9/74* (2006.01)
(52) U.S. Cl. ..................................... 348/584
(58) Field of Classification Search ............... 348/584, 348/586, 597–598, 588–590, 593
See application file for complete search history.

(56) References Cited

U.S. PATENT DOCUMENTS

| | | | | |
|---|---|---|---|---|
| 5,307,055 A * | 4/1994 | Baskin et al. | ............... | 345/2.2 |
| 5,710,573 A * | 1/1998 | Hung et al. | ............... | 345/634 |
| 6,020,931 A * | 2/2000 | Bilbrey et al. | ............... | 348/584 |
| 6,714,255 B2 * | 3/2004 | Dumont et al. | ............ | 348/569 |
| 6,897,874 B1 * | 5/2005 | Riach | ......................... | 345/558 |
| 2003/0174903 A1 * | 9/2003 | Chia et al. | ................. | 382/276 |
| 2004/0085480 A1 * | 5/2004 | Salzer et al. | ............... | 348/584 |
| 2006/0112414 A1 * | 5/2006 | Ikonen et al. | ............... | 725/133 |

* cited by examiner

*Primary Examiner*—Paulos M. Natnael
(74) *Attorney, Agent, or Firm*—DLA Piper US LLP

(57) ABSTRACT

The present invention provides a system and method for overlaying video from different video sources on a display device. The sources may include a primary video source that provides first image data in the form of a first video signal, and an overlay video source that provides second image data in the form of a second video signal and a fast blank signal. The system encodes the fast blank signal into the second video signal to form encoded image data. The fast blank signal can occupy one bit of the encoded image data. The system stores the first image data and the encoded image data in a frame buffer. A controller reads the first image data and the encoded image data from the frame buffer. The controller processes and decodes encoded image data, extracting the fast blank signal. The controller then uses the extracted fast blank signal to combine the second image data and the first image data, effective to overlay an image from the overly video source onto an image from the primary video source.

18 Claims, 2 Drawing Sheets

SYSTEM AND METHOD FOR OVERLAYING IMAGES FROM MULTIPLE VIDEO SOURCES ON A DISPLAY DEVICE

FIELD OF THE INVENTION

The present invention generally relates to display devices, and more particularly to a system and method for overlaying images originating from different video sources on a display device.

BACKGROUND OF THE INVENTION

Electronic display devices may be used to display images from multiple video sources. For example, a computer or other target device may receive signals from multiple video sources and combine the signals to produce an image that is communicated to a display monitor. The combination may involve overlaying images from one video source onto images from another video source in order to produce a "picture-in-picture" effect, background graphics, windows and the like.

This overlay process may be performed on a pixel-by-pixel basis. One way to perform such an overlay is by use of a fast blank signal. A fast blank signal is typically a one-bit signal that may be used to indicate to the display device where video from the second source should be overlaid onto video from the first source. For example, when the second video source reaches a certain x, y position or pixel, it transmits a fast blank signal to the target device. The fast blank signal causes the video from the second source to replace the video from the first source for that pixel. Because the primary (first) source and overlay (second) source typically operate independently (e.g., at different frequencies), the sources must be synchronized prior to the overlay process. This may involve primary source acting as a master and providing horizontal and vertical synchronization signals to the overlay source, which acts as a slave. This synchronization and corresponding overlay process is very complicated and difficult, especially in applications requiring frame rate conversion and scaling to different resolutions.

Therefore, it would be desirable to provide a new and improved system and method for overlaying images from multiple video sources on a display device, which allows video from an overlay source to be combined with video from a primary source without receiving synchronization signals from the primary source.

SUMMARY OF THE INVENTION

The present invention provides a system and method for overlaying video from different video sources on a display device. The sources may include a primary video source that provides first image data in the form of a first video signal, and an overlay video source that provides second image data in the form of a second video signal and a fast blank signal. The system encodes the fast blank signal into the second video signal to form encoded image data. The fast blank signal may occupy one bit of the encoded image data. The system stores the first image data and the encoded image data in a frame buffer. A controller reads the first image data and the encoded image data from the frame buffer. The controller processes and decodes encoded image data, extracting the fast blank signal. The controller then uses the extracted fast blank signal to combine the second image data and the first image data, effective to overlay an image from the overlay video source onto an image from the primary video source.

One non-limiting advantage of the present invention is that it overlays images from two video sources without synchronizing the video sources.

Another non-limiting advantage of the present invention is that it combines image data from two video sources while facilitating frame rate conversion, scaling and interlaced/de-interlaced mode conversion of the image data.

According to one aspect of the present invention, a system is provided for combining images from a first video source and a second video source on a display device. The system includes a frame buffer for storing image data; a first circuit that stores first image data from the first video source in the frame buffer, that encodes a fast blank signal into second image data from the second video source to form encoded image data, and that stores the encoded image data in the frame buffer. A second circuit reads the first image data and the encoded image data from the frame buffer, and decodes the encoded image data to separate the fast blank signal and the second image data. A third circuit is coupled to the second circuit and uses the fast blank signal to selectively transmit the first image data and the second image data to the display device, effective to cause the display device to display an image from the second video source overlaid onto an image from the first video source.

According to another aspect of the present invention, a system is provided for overlaying images from first and second video sources on a display device. The system includes a frame buffer for storing image data; and a controller that receives first image data from the first video source and second image data and a fast blank signal from the second video source, and that stores and reads image data in the frame buffer. The controller includes a capture and encoding circuit that captures the fast blank signal and encodes the fast blank signal into the second image data, effective to form encoded image data, and that transmits to the encoded image data to the frame buffer for storage. The controller further includes a processing and decoding circuit that receives the first image data and the encoded image data from the frame buffer, that processes the image data and that decodes the encoded image data to separate the fast blank signal and the second image data. A combiner receives the processed first image data, second image data and fast blank signal, and that uses the fast blank signal to selectively transmit the first image data and the second image data to the display device, effective to cause the display device to display an image from the second video source overlaid onto an image from the first video source.

According to another aspect of the present invention, a method is provided for combining images from first and second video sources on a display device. The method includes receiving first image data from the first video source; receiving second image data from the second video source; capturing a fast blank signal associated with the second image data; encoding the fast blank signal into the second image data, effective to form encoded image data; storing the first image data and encoded image data in a frame buffer; reading the first image data and encoded image data from the frame buffer; decoding the encoded image data to separate the fast blank signal and the second image data; and using the fast blank signal to selectively transmit the first image data and the second image data to the display device, effective to cause the display device to display an image from the second video source overlaid onto an image from the first video source.

These and other features and advantages of the invention will become apparent by reference to the following specification and by reference to the following drawings.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Figure 1:
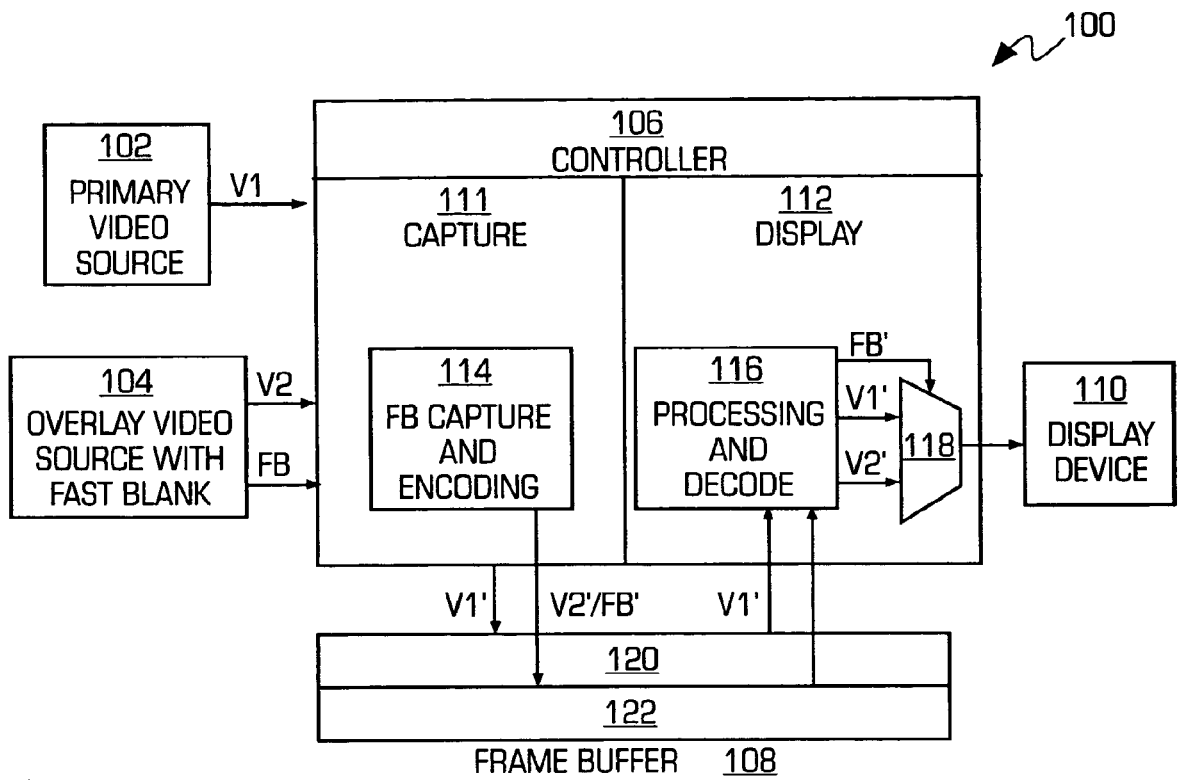
FIG. 1 is a block diagram of a system for overlaying images from multiple video sources on a display device in accordance with the present invention.

FIG. 1 illustrates a block diagram of a method and system 100 for overlaying images from multiple video sources on a display device, according to one embodiment of the present invention. While the following discussion relates to a system 100, it should be appreciated that each of the portions or blocks illustrated in FIG. 1 (as well as the other Figures) may represent logic steps or processes performed according to an inventive method. Conventional hardware, software and/or firmware may be used to perform the logic steps and/or processes. It should further be appreciated that such logic steps or processes can be implemented as computer-executable instructions stored on a computer readable medium.

System 100 includes two video sources, a first or "primary" video source 102 and a second or "overlay" video source 104. The video sources 102, 104 are coupled to a controller 106. System 100 further includes a frame buffer 108 and a display device 110, both of which are coupled to controller 106. Video source 102 may be a conventional video source that provides first image data in the form of a first video signal V1. When received by the display device 110, the first image data causes the display device 110 to display a first image. Video source 104 may be an overlay video source that provides second image data in the form of a second video signal V2 and a fast blank signal FB. The fast blank signal FB may be a conventional fast blank signal that provides information that is used to overlay a second image provided by the second video signal V2 onto the first image provided by the first video signal V1. For instance, the fast blank signal FB may be used to indicate to the display device where video from the second source should be overlaid onto video from the first source (e.g., which pixels or x, y coordinates should be overlaid). The signals V1, V2 and FB may be generated and/or communicated by the video sources as analog or digital signals.

In one embodiment, controller 106 is a microprocessor-based control unit and may form a portion of a conventional display controller. Controller 106 includes a capture portion or module 111 and a display portion or module 112. The capture module 111 includes circuitry for capturing the video signals from sources 102 and 104, and a fast blank capture and encoding block 114. In one embodiment, the capturing circuitry includes one or more analog-to-digital converters for converting analog video signals into digital image data. Fast blank capture and encoding block 114 includes circuitry for capturing the fast blank signal and encoding it into image data from the second video signal V2, as described below in greater detail. The display module 112 includes a processing and decoding block 116 and a combiner 118. The processing and decoding block 116 may include processing circuitry such as circuits for de-interlacing, scaling and frame rate conversion, and circuitry for decoding encoded image data corresponding to the combined signal V2/FB (e.g., for extracting the fast blank signal FB from encoded image data). The combiner 118 may be a multiplexer that receives the first image data and the second image data and uses the fast blank signal to select between the two. The combiner 118 is coupled to the display device 110 and communicates selected data to the display device 110.

Frame buffer 108 may include a conventional storage device for storing image data, pixel by pixel, for each frame displayed by device 110. Frame buffer 108 may be separated into a first portion 120 that stores frames of the first image data from the primary video source 102, and a second portion 122 that stores frames of the encoded image data.

The display device 110 may include conventional image processing circuitry, display drivers, and a display screen or monitor. The circuitry and drivers receive the image data from combiner 118 and drive the electronics in the display monitor to cause the display monitor to display the combined image.

Figure 2:
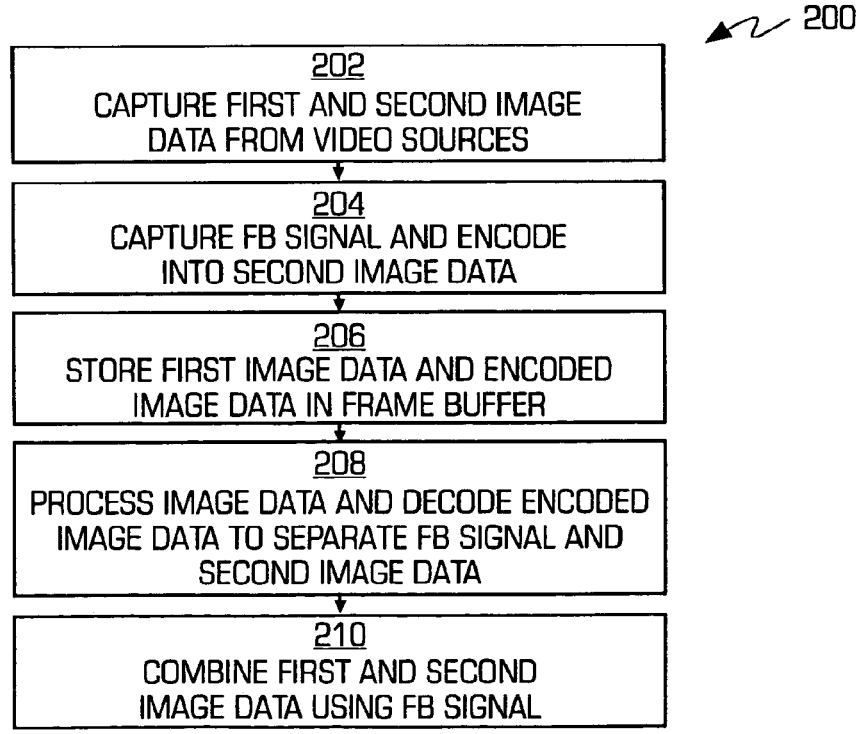
FIG. 2 is a block diagram illustrating a method for overlaying images from multiple video sources on a display device in accordance with the present invention.

In operation, the system 100 uses the encoded fast blank signal to automatically display images from the second video source 104 overlaid onto images from the first video source 102 in a simplified and improved manner. FIG. 2 illustrates one example of a method 200 that may be employed by the system 100 to perform this overlay process. In step 202, the controller 106 captures image data from sources 102 and 104. In one embodiment, this may involve receiving the video signals V1, V2 and fast blank signal FB and converting the signals from analog to digital format to form first image data V1', second image data V2' and a digitized fast blank signal FB'. In step 204, the block 114 encodes the digitized fast blank signal FB' into the second image data V2', forming encoded image data V2'/FB'. Block 114 preferably encodes the digitized fast blank signal FB' into a specific code in an identifiable portion of the digitized second video signal V2', such that the digitized fast blank signal and the digitized second video signal share the same bits. In one embodiment, the specific code comprises a single bit of the digitized second video signal V2' (e.g., the least significant bit). For example, in a 16-bit video data stream only 1 of the $2^{16}$ values is used as FB code. When the encoded digital signal is stored in the frame buffer, the image data for each pixel will include one bit that represents the FB encoding. Those skilled in the art will appreciate that the use of a single value for encoding purposes in the multi-bit video signal will not be visually noticeable by a user of the display.

In step 206, the controller 106 stores the first image data V1' and encoded image data V2'/FB' in the frame buffer 108. In one embodiment, the first image data V1' is stored in a first portion 120 of the frame buffer 108, and the encoded image data V2'/FB' is stored in a second portion 122 of the frame buffer 108. Particularly, portion 120 stores a frame of the first image data V1' pixel by pixel, and portion 122 stores a frame of the encoded image data V2'/FB' pixel-by-pixel.

In step 208, the controller 106 reads the image data from the frame buffer 108. Processing and decoding block 116 then processes the image data V1' and V2'/FB' and decodes the encoded image data V2'/FB'. The processing steps may include procedures such as de-interlacing, scaling and frame rate conversion. The processing and decoding steps may occur in different orders depending on the properties (e.g., format, frame rate, resolution and the like) of video sources 102, 104 and display device 110. Based on these properties, the structure and operation of the processing and decoding block 116 may vary from application to application, as will be appreciated to those skilled in the art. For explanatory purposes, operation of step 208 will be described in relation to one example of a processing and decoding block 116.

Figure 3:
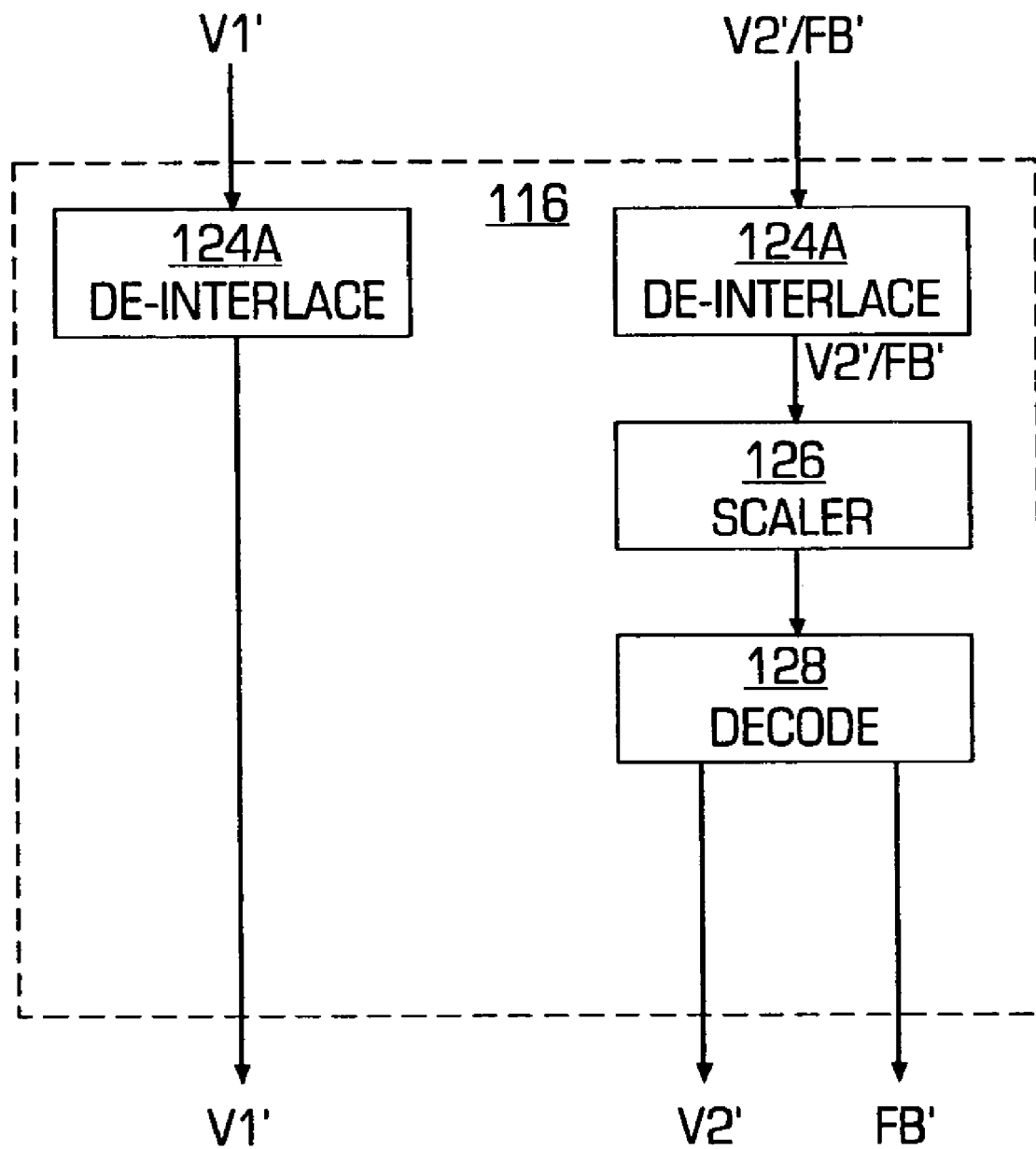
FIG. 3 illustrates one embodiment of a process and decoding circuit for use in the system shown in FIG. 1.

FIG. 3 illustrates one embodiment of the processing and decoding block 116. In this embodiment, block 116 includes de-interlacing circuits 124A and 124B, a scaling circuit 126 and a decoding circuit 128. De-interlacing circuits 124A and 124B are adapted to convert the interlaced image frames from sources 102 and 104 to progressive frames for display on display monitor 110. In other embodiments, either or both sources 102, 104 may provide progressive video signals, thereby eliminating the need for either or both de-interlacing circuits 124A, 124B. In alternate embodiments, display monitor 110 may be adapted to display interlaced images, in which case circuits 124A, 124B could be also eliminated.

Scaling circuit 126 is coupled to the de-interlacing circuit 124B, and comprises a conventional resolution scaling circuit. The circuit 126 is adapted to scale the resolution of the second image data V2' (e.g., 640×480) from the second video source to the resolution of display 110 (e.g., 1024×700). In this example, the resolution of the first image data V1' from video source 102 is the same as the display 110 (e.g., 1024×700 resolution), so only a single scaling circuit is required. In other embodiments where the resolution of the first video source differs from the display 110, a second scaling circuit may be used to scale the first image data V1' to the resolution of the display 110.

The decoder 128 is coupled to the scaling circuit and is adapted to decode the encoded image signal V2'/FB' by extracting the fast blank signal FB'. This produces two separate signals, the second image data V2' and the fast blank signal FB'. The processing and decoding block 116 transfers the first and second image data V1', V2' and the fast blank signal FB' to the combiner 118.

In alternate embodiments, the circuits and/or the processes performed by the circuits in block 116 may occur in a different order. For example, the encoded image data V2'/FB' may be decoded prior to scaling and/or de-interlacing. Furthermore, block 116 may include additional or different processes and/or processing circuits.

The combiner 118 receives the image data V1', V2' and the fast blank signal FB' from block 116. As shown, the combiner includes a multiplexer that receives the first image data V1' and second image data V2' and uses the fast blank signal FB' to select between the two. In one embodiment, when the fast blank signal FB' has a high value ("1"), the combiner 118 transfers only the second image data V2' to the display monitor 110, and when the fast blank signal FB' has a low value ("0"), the combiner 118 transfers only the first image data V1' to the display monitor 110. In this manner, the controller 106 causes the display to overlay the image from the second video source 104 onto the image from the first video source 102, pixel by pixel.

From the foregoing, it should be apparent that the present invention provides an improved system and method for overlaying images from one video source onto images from another video source. It should further be apparent that the present invention combines images from an overlay video source with images from a primary video source without having to synchronize the two video sources. This significantly reduces the cost and complexity of the overlay system. The present invention also overlays images from the video sources in a simple manner that can flexibly adjust for different properties, resolutions and/or configurations of the video sources and the display monitor. The present invention also allows for frame rate conversion and interlaced/de-interlaced mode conversion.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A system for combining images from a first video source and a second video source on a display device, the system comprising:
   a frame buffer for storing image data;
   a first circuit that is capable of converting first image data from the first video source into digital data storing the first image data from the first video source in the frame buffer, converting second image data from the second video source into a multi-bit digital signal and encoding a fast blank signal as a value of one or more bits into the second image data to form encoded image data, and storing the encoded image data in the frame buffer;
   a second circuit that reads the first image data and the encoded image data from the frame buffer, and that decodes the encoded image data to separate the fast blank signal and the second image data; and
   a third circuit that uses the fast blank signal to selectively transmit the first image data and the second image data to the display device, effective to cause the display device to display an image from the second video source overlaid onto an image from the first video source.

2. The system of claim 1 wherein the second circuit is further adapted to process at least some of the image data.

3. The system of claim 2 wherein the second circuit comprises a de-interlacing circuit for de-interlacing image data.

4. The system of claim 2 wherein the second circuit comprises a scaler for scaling image data.

5. The system of claim 2 wherein the second circuit comprises a frame rate conversion circuit.

6. The system of claim 2 wherein the third circuit comprises a multiplexer.

7. A system for overlaying images from first and second video sources on a display device, the system comprising:
   a frame buffer for storing image data; and
   a controller that receives first image data from the first video source and second image data and a fast blank signal from the second video source, wherein the controller receives first image data and second image data in the form of analog signals and converts the analog signals into digital data, and is further capable of storing and reading image data in the frame buffer, the controller comprising:

an encoding circuit that encodes the fast blank signal as a value of one or more bits into the second image data comprising a multi-bit digital signal, effective to form encoded image data, and that transmits to the encoded image data to the frame buffer for storage;

a processing and decoding circuit that receives the first image data and the encoded image data from the frame buffer, that processes the image data and that decodes the encoded image data to separate the fast blank signal and the second image data;

a combiner that receives the first image data, second image data and fast blank signal, and that uses the fast blank signal to selectively transmit the first image data and the second image data to the display device, effective to cause the display device to display an image from the second video source overlaid onto an image from the first video source.

8. The system of claim 7 wherein the multi-bit digital signal is a sixteen bit digital signal.

9. The system of claim 7 wherein the frame buffer includes a first portion for storing the first image data and a second portion for storing the second image data.

10. The system of claim 7 wherein the combiner comprises a multiplexer.

11. The system of claim 7 wherein the processing and decoding circuit is adapted to de-interlace at least one of the first and second image data.

12. The system of claim 7 wherein the processing and decoding circuit is adapted to scale at least one of the first and second image data.

13. The system of claim 7 wherein the processing and decoding circuit is adapted to perform frame rate conversion on at least one of the first and second image data.

14. A method for overlaying images from first and second video sources on a display device, the method comprising:

receiving first image data from the first video source;

receiving second image data from the second video source;

receiving a fast blank signal associated with the second image data, wherein the first image data, second image data and fast blank signal are received in the form of analog signals;

converting the analog signals into digital signals;

encoding the fast blank signal as a value of one or more bits into the second image data comprising a multi-bit digital signal, effective to form encoded image data;

storing the first image data and encoded image data in a frame buffer;

reading the first image data and encoded image data from the frame buffer;

decoding the encoded image data to separate the blank signal and the second image data; and using the fast blank signal to selectively transmit the first image data and the second image data to the display device, effective to cause the display device to display an image from the second video source overlaid onto an image from the first video source.

15. The method of claim 14 further comprising: processing at least one of the first and second image data.

16. The method of claim 15 wherein the processing comprises de-interlacing.

17. The method of claim 15 wherein the processing comprises scaling.

18. The method of claim 15 wherein the processing comprises frame rate conversion.

* * * * *